United States Patent [19]

Bock

[11] Patent Number: 4,784,369

[45] Date of Patent: Nov. 15, 1988

[54] CAMPER LIFT JACK AND HAND CRANK

[75] Inventor: James D. Bock, Elkhart, Ind.

[73] Assignee: Bock Products, Inc., Elkhart, Ind.

[21] Appl. No.: 184,184

[22] Filed: Apr. 21, 1988

[51] Int. Cl.[4] .................................................. B60P 3/32

[52] U.S. Cl. ...................................... 254/45; 81/124.2; 81/124.7; 81/119; 254/DIG. 3

[58] Field of Search .................... 254/45, DIG. 3, 424, 254/425, 98; 81/119, 124.2, 124.7, 901, 125.1

[56] References Cited

U.S. PATENT DOCUMENTS

| | | | |
|---|---|---|---|
| 1,181,565 | 5/1916 | Block | 81/124.2 |
| 1,550,436 | 8/1925 | Hall | 81/119 |
| 2,780,387 | 2/1957 | Hertzfeldt | 81/119 |
| 3,698,758 | 10/1972 | Dodgen | 254/45 |
| 4,586,696 | 5/1986 | Mugford et al. | 254/DIG. 3 |

*Primary Examiner*—Robert C. Watson
*Attorney, Agent, or Firm*—Thomas J. Dodd

[57] ABSTRACT

A lifting jack for campers or similar structures. The jack includes a base with extensible tubes and a hand crank for raising and lowering one of the tubes to a desired height. The hand crank includes a handle which slips over a rotatable shaft and serves to rotate the shaft and raise or lower the tube. The handle also defines a hex bore for tightening the hex nuts associated with the jack mounting bracket.

2 Claims, 4 Drawing Sheets

CAMPER LIFT JACK AND HAND CRANK

SUMMARY OF THE INVENTION

This invention relates to lift jacks and will have particular application to a crank handle for a camper lift jack in combination.

Portable towed campers often require lift jacks to raise and lower the camper, and to support it when removed form the towing hitch. Conventional lift jacks operate on a nut-socket principle with the crank handle fitted over an adjustable shaft and pin connected to the adjustable jack stem.

The jack of this invention includes an actuator pin connected to the extensible tube of the jack stem. A leverage pin extends through the actuator pin. The jack hand crank includes a bracket which is generally U-shaped and defines aligned bores to allow the bracket to be fitted over the actuator pin. One of the aligned bores further defines a slot which allows the bracket to slip over the leverage pin so that rotation of the crank handle causes the leverage pin to bear on the bottom wall of the bracket. Rotation of the handle is thereby transferred through the actuator pin to the adjustment shaft to raise and lower the jack. The bracket may also define a hex bore to allow the hand crank to function as a wrench.

Accordingly, it is an object of this invention to provide for an improved lift jack.

Another object of this invention is to provide for a lift jack hand crank which does not disengage from the actuator pin during turning.

Another object of this invention is to provide for a lift jack hand crank which also functions as a box wrench.

Another object of this invention is to provide a camper lift jack which is efficient, durable, and economical.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application to practical use whereby others skilled in the art may utilize the invention.

Figure 1:
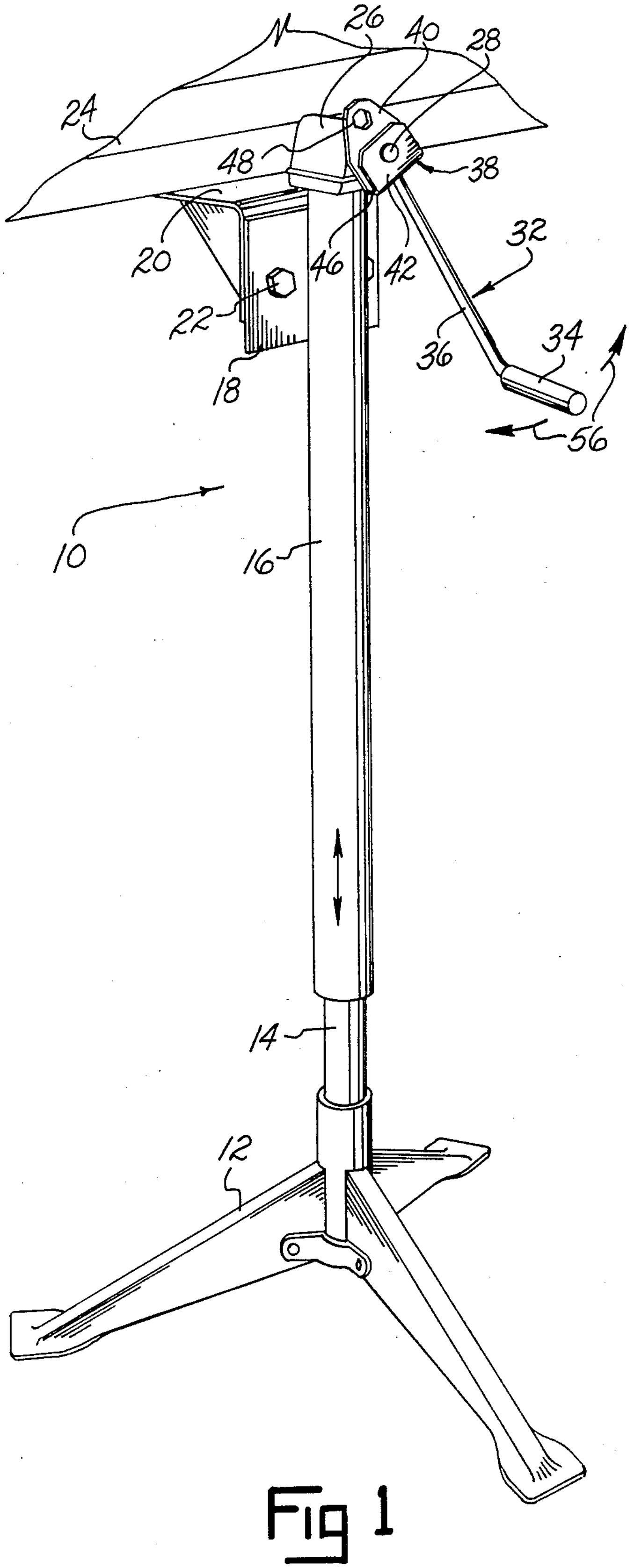
FIG. 1 is a perspective view of the lift jack of this invention.
Figure 2:
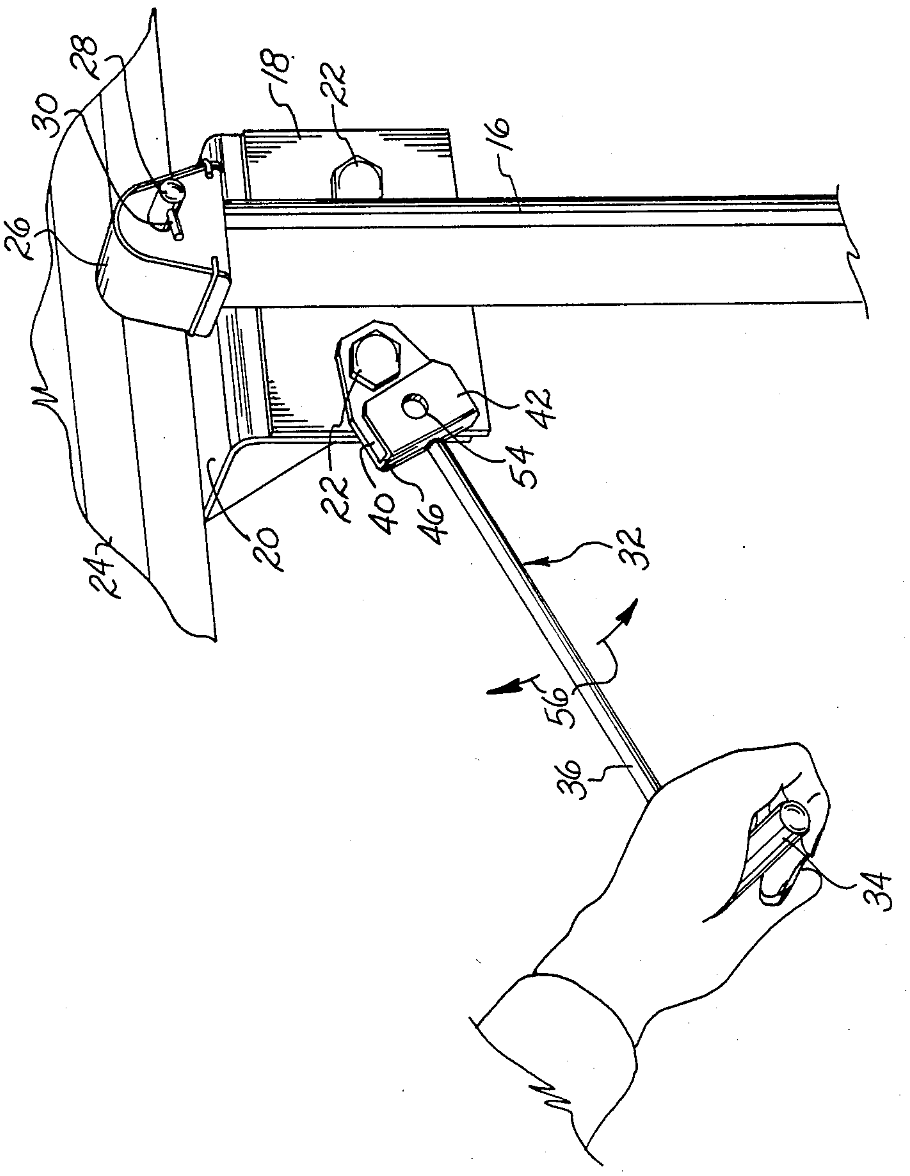
FIG. 2 is a fragmentary perspective view of the lift jack with the crank handle being used as a box wrench.
Figure 4:
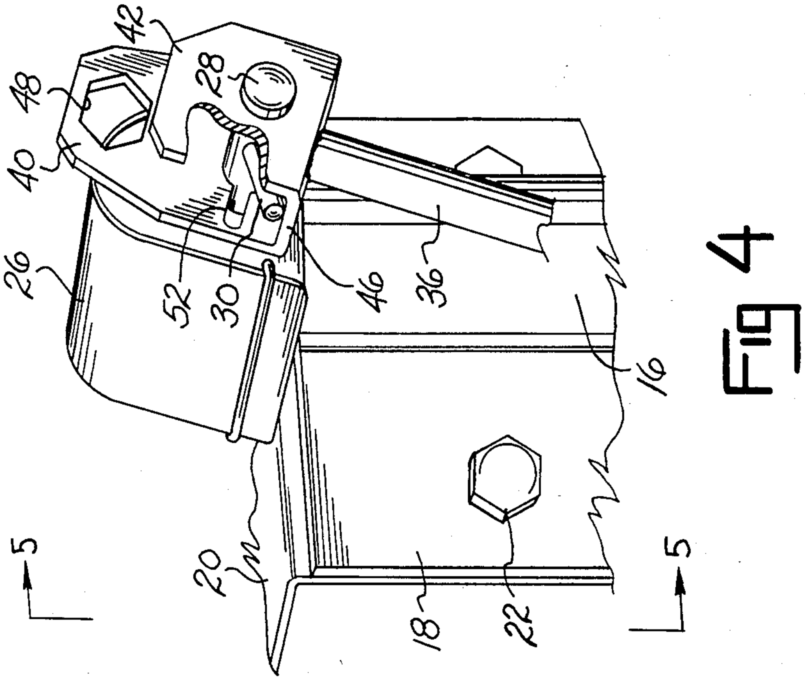
FIG. 4 is a fragmentary perspective view of the hand crank shown in the adjustment position with a portion of one wall of the crank bracket cut away for illustration.
Figure 3:
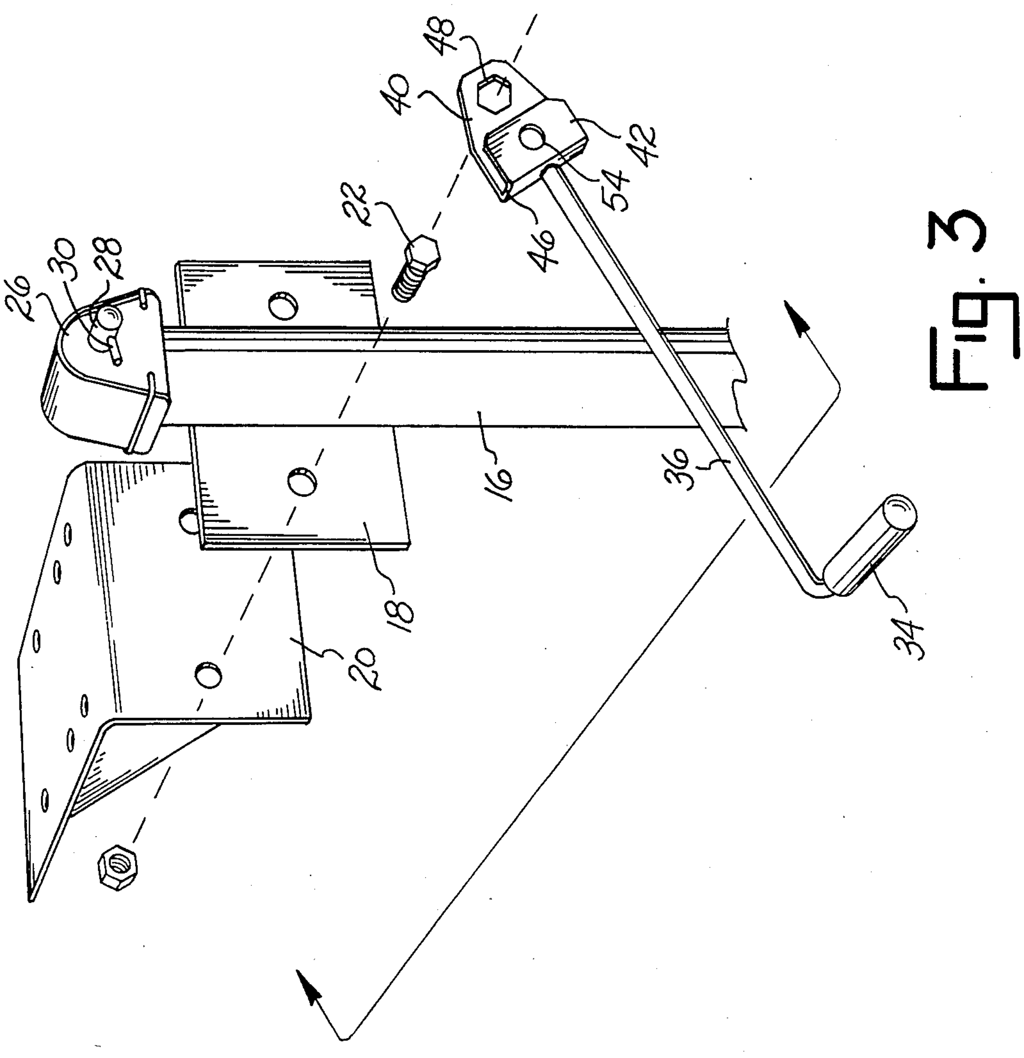
FIG. 3 is an exploded view of the lifting head with the jack stem shown in fragmented form.

Referring now to the drawings, and in particular to FIG. 1, reference numeral 10 generally indicates the lift jack of this invention. Jack 10 preferably includes a base 12, shown as a folding tripod in FIG. 1, and a pair of telescoping tubes 14, 16 with the tube 16 carrying a fixed mounting bracket 18. A lifting head 20 is connected to mounting bracket 18 by bolts, hereinafter generally referred to as fasteners 22, and is adapted to be positioned under a wall 24 of a camper or the like (not shown) for the purpose of supporting the camper above the ground apart from a towing or carrying vehicle (not shown).

Connected to the top of tube 16 is a housing 26 which encloses the lifting mechanism (not shown) for raising tube 16 relative to tube 14. The actual lifting mechanism (not shown) is a conventional device (such as threaded follower) and is driven by a rotatable actuator pin 28 which protrudes outwardly of housing 26. A leverage pin 30 protrudes radially outwardly of actuator pin 28 as shown.

Figure 6:
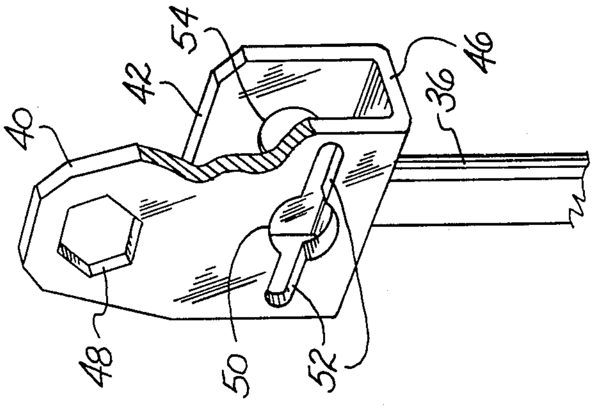
FIG. 6 is a perspective view of the hand crank bracket illustrating the slotted bore and with a portion of one wall of the crank bracket cut away for illustration.
Figure 5:
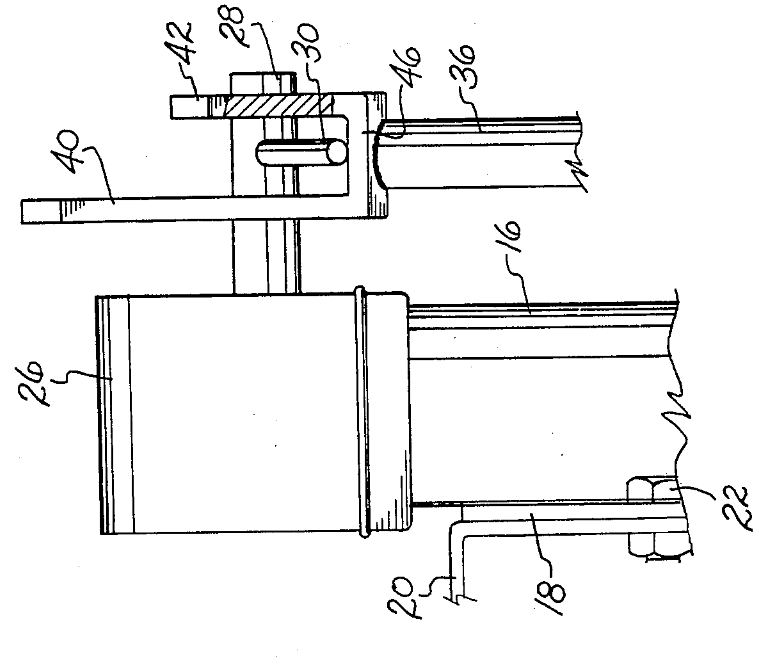
FIG. 5 is an end view of the lift jack in the same position as shown in FIG. 4 as seen from line 5—5 of FIG. 4.

A hand crank, generally identified by reference numeral 32, is utilized to operate jack 10. Hand crank 12 includes a handle 34 integral with shaft 36. A generally U-shaped bracket 38 is connected to shaft 36, preferably by welding. Bracket 38 is preferably formed by bending a shaped metal plate to form a side wall 40, a side wall 42 and a bottom wall 46. Side walls 40, 42 extend from bottom wall 46 generally parallel with respect to each other. Side wall 40 is preferably longer than side wall 42 and defines hex bore 48 and round bore 50. A slot 52 is also defined in wall 40 as shown in FIG. 6. Wall 42 defines a bore 54 substantially aligned with bore 50.

Hand crank 32 is used to operate jack 10 as follows. Bores 50 and 54, which are of essentially the same shape and size as actuator pin 28, are aligned with the actuator pin, and leverage pin 30 is aligned with slot 52. Side wall 40 of bracket 38 is then slipped over actuator pin 28 and leverage pin 30, and handle 34 is turned in one of the directions identified by arrows 56 until the leverage pin contacts bracket bottom wall 46. Continued turning causes actuator pin 28 to rotate, raising or lowering tube 16 and its connected lifting head 20.

In order to reduce the number of tools carried, as well as to ensure that the jack can always be utilized, hand crank 32 is structured so to be used as a box wrench. To this end, bore 48 is shaped to conform to the shape of the head of fastener 22. Hand crank 32 is operated as a box wrench by aligning hex bore 48 with a fastener 22, slipping wall 40 of bracket 38 over the fastener and turning.

It is understood that the above description does not limit the invention to the precise details above given, but may be modified within the scope of the following claims.

I claim:

1. In combination, a lift jack and a hand crank, said lift jack including lift bracket means adapted to be positioned beneath a vehicle frame, extendable tube means connected to said lift bracket means for raising and lowering said lift bracket means, a rotatable actuator pin connected to said tube means, said actuator pin constituting means for effecting the raising and lowering of said tube means, and a leverage pin protruding outwardly of said actuator pin for facilitating connection to said hand crank to rotate the actuator pin, the improvement wherein said hand crank includes a shaft connected to a generally U-shaped bracket which is defined by side walls spacedly connected to a bottom wall, said side walls defining aligned bores fittable over said actuator pin, one of said side wall bores defining a slot adjacent said bore wherein said U-shaped bracket may be fitted over said actuator pin and leverage pin with the leverage pin contacting said bracket bottom wall as the hand crank is rotated to effect turning of said actuator pin.

2. The combination of claim 1 wherein said one U-shaped bracket side wall further defines a multiple-sided bore means for fitting over and tightening a fastener which connects said lift bracket means to said tube means.

* * * * *